United States Patent [19]

Joy

[11] 4,437,349
[45] Mar. 20, 1984

[54] VORTEX FLOW METER FREQUENCY ADJUSTMENT

[75] Inventor: Robert D. Joy, Cedar Rapids, Iowa

[73] Assignee: Ford Motor Company, Dearborn, Mich.

[21] Appl. No.: 434,141

[22] PCT Filed: Sep. 16, 1982

[86] PCT No.: PCT/US82/01265

§ 371 Date: Sep. 16, 1982

§ 102(e) Date: Sep. 16, 1982

[51] Int. Cl.³ .............................................. G01F 1/32
[52] U.S. Cl. .................................................. 73/861.22
[58] Field of Search ............ 73/861.22, 861.23, 861.24

[56] References Cited

U.S. PATENT DOCUMENTS

| | | | |
|---|---|---|---|
| 3,724,503 | 4/1973 | Cooke | 73/861.63 X |
| 3,796,095 | 3/1974 | Fussell, Jr. | 73/861.24 |
| 3,906,792 | 9/1975 | Miller | 137/45 X |
| 3,937,195 | 2/1976 | Woods | 73/861.22 X |
| 4,003,253 | 1/1977 | Yard et al. | 73/861.22 |
| 4,062,238 | 12/1977 | Herzl | 73/861.24 |
| 4,116,060 | 9/1978 | Frederick | 73/861.22 |
| 4,312,236 | 1/1982 | Mahany et al. | 73/861.22 |

*Primary Examiner*—Herbert Goldstein
*Attorney, Agent, or Firm*—Peter Abolins; Robert D. Sanborn

[57] ABSTRACT

An air flow meter (10) has an air flow channel (11) with a vortex generator or strut (13). The cross sectional area of the air flow adjacent the vortex generator is varied to change the flow velocity and hence to change the vortex frequency. The cross sectional area can be changed by rotating strut (13), moving a flexible plate (24) in a sidewall (22), or moving a vortex generator (33) to a region of different cross sectional area.

8 Claims, 3 Drawing Figures

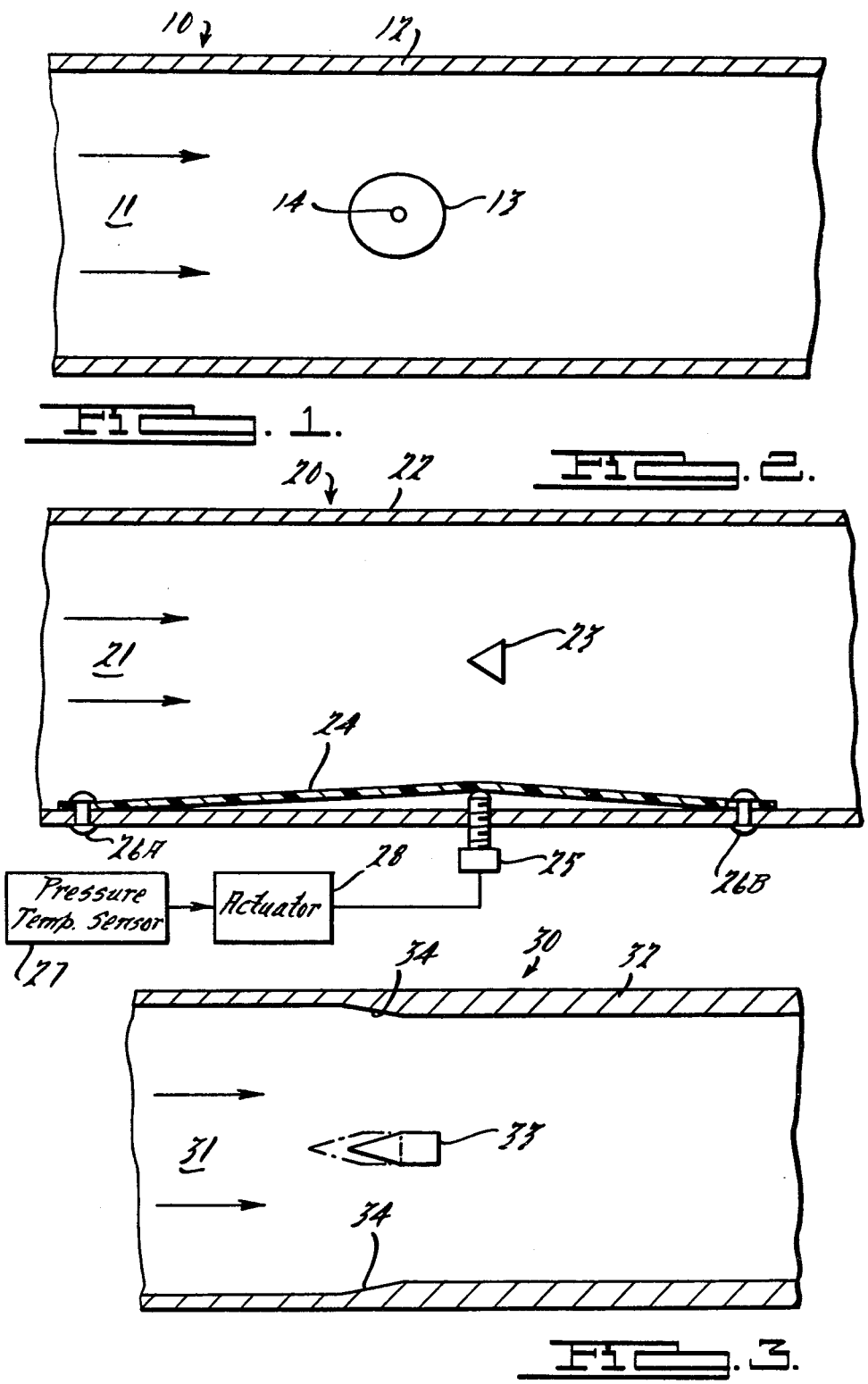

VORTEX FLOW METER FREQUENCY ADJUSTMENT

TECHNICAL FIELD

Embodiments of the invention hereinafter described pertain to devices for the generation of vortices.

BACKGROUND ART

It is known to position a generator plate in an air flow to generate Karman vortices. Detection of the frequency of these vortices can be used as an indication of the mass of air flowing by the generator plate. For example, U.S. Pat. No. 4,312,237 issued Jan. 26, 1982 discloses various embodiments of narrow, elongated generator plates used for the generation of Karman vortices in a fluid stream. In one embodiment of U.S. Pat. No. 4,312,237, a generator plate has a shedding section wherein an aperture intersects side surfaces of the generator plate to form a leading aperture edge which serves as a shedding corner for the generation of vortices.

Also, U.S. Pat. No. 4,312,236 issued Jan. 26, 1982 discloses a vortex generating device having a narrow generator plate which is immersed in a fluid flow to generate Karman vortices. The generator plate has side surfaces parallel to the direction of fluid flow. The side surfaces have a shedding region therein forming shedding corners at which vortices detach from the generator plate.

Air flow meters using such vortex generators have produced stable vortices over a wide range of fluid flow rates. Such devices have functioned particularly well and operated in accordance with the acoustical techniques disclosed in U.S. Pat. No. 3,680,375 to Joy et al.

However, there has been a problem of adjusting the vortex frequency to a precise value at a given flow for flow meters that do not have precise mechanical dimensions.

The vortex flowmeter has the characteristic of having a quasi-digital output where each output pulse represents the passage of a certain amount of fluid. This amount of fluid is determined by the flow duct area and the cross section width of the vortex generator. This relationship is defined by:

$$f = SQ/dA \qquad \text{Equation 1}$$

where
- f is the vortex frequency
- S is the Strouhal constant
- Q is the volumetric flow rate
- d is the vortex generator width and
- A is the flow duct area In order to produce flowmeters having an identical vortex frequency to fluid flow relation, the mechanical duct area must be held to precise tolerances.

For some applications where tight tolerances cause a cost penalty, such as in the automotive field, a means is needed to adjust some mechanical dimension to change the frequency-to-flow relation in order to offset manufacturing tolerances.

DISCLOSURE OF INVENTION

In accordance with principles of this invention, a change in the flow velocity and, hence a change in the vortex frequency, is caused by changing the flow duct area which is unobstructed by the vortex generator cross section. Such a change in the unobstructed flow duct area can be caused by either changing the width of the vortex generator or by adjusting the boundaries of the flow duct area.

BRIEF DESCRIPTION OF THE DRAWINGS

FIG. 1 is a top view of an air flow meter in accordance with an embodiment of this invention including provisions for varying the vortex generator width;

FIG. 2 is a top view of an air flow meter in accordance with an embodiment of this invention including means for varying the boundaries of the air flow ducts; and FIG. 3 is an air flow meter in accordance with an embodiment of this invention wherein the vortex generator is longitudinally movable to sections of the air flow duct having different interior boundaries.

BEST MODES FOR CARRYING OUT THE INVENTION

Referring to FIG. 1, an air flow meter 10 has an air flow channel 11 with walls 12. Positioned within air flow channel 11 is an elongated plate number such as a vortex generator or strut 13 having an elliptical cross section. The vortex strut 13 dimension that governs the shed frequency is the width of the strut, measured at right angles with respect to the flow. Vortex strut 13 can be rotated about an axis 14. This will cause the cross sectional area of strut 13 exposed to the air flow to change. The change in vortex frequency correlates very closely with the expected change based upon the projected width. Therefore, an elliptical strut with a ten percent difference in its major and minor axes will cause a total frequency change of ten percent when rotated through 90°.

Referring to FIG. 2, an air flow meter 20 has a flow channel 21 bounded by walls 22. An elongated plate member such as a vortex generator 23 is positioned within the flow channel 21. Sidewall 22 includes a flexible plate 24 which can be deflected by an adjustment screw 25. Plate 24 is elongated and is secured to wall 22 by pins 26A and 26B. Advantageously, plate 24 can move longitudinally with respect to pin 26B. Although screw 25 can be turned manually, the position of screw 25 can be made to be a function of a sensor, such as a pressure temperature sensor 27 which provides an electrical signal to an actuator 28 which is mechanically coupled to screw 25. The variable flow duct area provided by plate 24 in air flow meter 20 is advantageous where a simple vortex strut cannot be used. For example, when vortex pulse to pulse stability is important, a simple strut such as 13 shown in FIG. 1 cannot be used. As a result, one or more adjustable air duct sidewalls which can be distorted by exerting a force on wall 22 are used to adjust the duct area. Strut 23 can be of any advantageous cross section. As adjustment screw 25 is turned in, flexible plate 24 distorts since it is constrained to sidewalls 22 at both ends, and causes a reduction in area of the duct air flow path 21. This change in area causes a compensating increase in the velocity which produces a higher vortex frequency.

Referring to FIG. 3, an air flow meter 30 includes an air flow path 31 with bounding walls 32. An elongated plate member such as a vortex strut or generator 33 is positioned within air flow path 31 and is movable longitudinally. Opposing interior surfaces of walls 32 have a variable spacing so that the cross sectional area of air flow path 31 is different at different longitudinal positions. Because strut 33 is movable longitudinally, it can be positioned in different size cross sectional areas thereby changing the vortex frequency. Advantageously, a reduction in the cross sectional duct area can be created by a gradual decrease in one or more of the duct sidewalls such as shown in region 34. This causes a gradual increase in the velocity and the vortex strut 33 may be moved through this region to cause a change in the detected vortex frequency to fluid flow relation. Advantageously, the change in cross sectional area along region 34 is linear. Again, this structure will perform satisfactorily with a variety of complex vortex generators. Changes in the duct area have been found to cause corresponding changes in the vortex frequencies.

The structures of FIGS. 1, 2 and 3 show apparatus for changing the output frequency of a vortex flow meter. Such a change is useful for compensating for variations in mechanical dimensions of the flow meters due to manufacturing tolerances. However, the apparatus may be used for different purposes. For example, as shown in FIG. 2, the mechanical motion causing a change in the vortex frequency may be a function of the output of pressure and/or temperature sensors to offset changes in gas density and hence cause the air flow meter to indicate mass flow rather than volumetric flow. Other methods could have the mechanical motion be a function of a process such as a programmed fuel enrichment and engine control systems, which could be applied during accelerating conditions and leaning of the fuel/air mixture during decelerating conditions.

Various modifications and variations will no doubt occur to those skilled in the various arts to which this invention pertains. For example, the particular tapering of the flow channel cross section and the construction of the movable plates in the flow channel may be varied from that disclosed herein. Further, in addition to using a sensor to actuate screw 25, a sensor can be used to actuate the rotation of vortex strut 13 about axis 14 and to actuate the longitudinal movement of vortex strut or generator 33. That is, the vortex frequency can be adjusted either manually or as a function of a sensed parameter. These and all other variations which basically rely on the teachings through which this disclosure has advanced the art are properly considered within the scope of this invention.

INDUSTRIAL APPLICABILITY

This invention has various industrial applications including, but not limited to, the measurement of air flow coming into an internal combustion engine and providing a signal for use by electronic engine controls governing engine operation. In particular, the measurement of the air flow can be used to govern the air fuel ratio supplied to the internal combustion engine.

I claim:

1. A device for generating vortices in a bounded fluid stream comprising:
   a fluid flow duct means for passing a fluid stream;
   a generator means for generating vortices positioned in said duct in the fluid stream;
   an adjustment means for varying the cross sectional area of the fluid flow adjacent said generator means; and wherein said generator means and said adjustment means include:
   an elongated plate member having a rotationally movable axis of elongation with respect to the direction of flow of the fluid, so that a different cross section can be presented to the fluid flow.

2. A device for generating vortices as recited in claim 1 wherein said elongated plate member has an elliptical cross sectional area and the axis of rotation is perpendicular to the cross sectional area.

3. A device for generating vortices as recited in claim 1 further comprising:
   a sensor means for generating a control signal for varying the cross sectional area of the fluid flow adjacent said generator means; and
   an actuator means coupled to said sensor means and said elongated plate member for rotating said elongated plate member as a function of the output of said sensor means.

4. A device for generating vortices in a bounded fluid stream comprising:
   a fluid flow duct means for passing a fluid stream;
   a generator means for generating vortices positioned in said duct in the fluid stream;
   an adjustment means for varying the cross sectional area of the fluid flow adjacent said generator means; and wherein:
   said generator means includes a narrow, elongated plate member having an axis of elongation parallel to the direction of flow of said fluid stream;
   said fluid flow duct means having a cross sectional area of different magnitudes along the direction parallel to the fluid flow; and
   said generator plate member being longitudinally movable to different cross sectional magnitudes in said duct.

5. A device for generating vortices as recited in claim 4 wherein said fluid flow duct means has at least a first cross sectional area and a second cross sectional area smaller in magnitude than said first cross sectional area.

6. A device for generating vortices as recited in claim 5 further comprising a transitional region between said first and second cross sectional areas, said transitional region having a decreasing cross sectional area going from said first to said second cross sectional area.

7. A device for generating vortices as recited in claim 6 wherein the cross section of said transitional region increases linearly with distance along said fluid flow duct means.

8. A method for changing the rate of generation of vortices by a vortex generator positioned in a fluid flow duct carrying a fluid stream including varying the cross sectional area of the fluid flow adjacent the vortex generator by moving the vortex generator to a position of the fluid flow duct having a different magnitude cross section.

* * * * *